United States Patent [19]
Eisinga

[11] Patent Number: 6,017,450
[45] Date of Patent: Jan. 25, 2000

[54] FILTER PRESS FRAME

[76] Inventor: Hendrik Eisinga, 12820 Greenwood Forest Dr. #1212, Houston, Tex. 77066

[21] Appl. No.: 08/927,313

[22] Filed: Sep. 11, 1997

[51] Int. Cl.⁷ .................................................. B01D 25/19
[52] U.S. Cl. .......................... 210/224; 210/230; 210/507; 210/508
[58] Field of Search ................................... 210/224, 230, 210/231, DIG. 3, 236, 249, 250, 506–509; 100/199, 269.17, 278, 295

[56] References Cited

U.S. PATENT DOCUMENTS

| | | | |
|---|---|---|---|
| 2,812,065 | 11/1957 | Wilson | 210/DIG. 3 |
| 3,233,733 | 2/1966 | Moss | 210/230 |
| 4,353,947 | 10/1982 | Northcutt | 428/116 |
| 4,608,922 | 9/1986 | Pohl | 100/264 |
| 4,627,133 | 12/1986 | Bartlow | 24/298 |
| 5,006,215 | 4/1991 | Borrione et al. | 210/230 |
| 5,725,767 | 3/1998 | Culkin | 210/231 |

FOREIGN PATENT DOCUMENTS

| | | | |
|---|---|---|---|
| 16304 | 8/1898 | United Kingdom | 210/231 |
| 1410645 | 10/1975 | United Kingdom | 210/231 |

*Primary Examiner*—Matthew O. Savage
*Attorney, Agent, or Firm*—Kenneth L. Nash

[57] ABSTRACT

A filter press frame and method, operable for compressing a stack of filter plates, provides a very light frame as compared to the iron, steel and stainless steel filter press frames that have been used for the last one hundred years. The filter press frame of the present invention is formed of material much more resistant to corrosion for a much wider pH spectrum of acids and bases than iron, steel, and stainless steel frames. In a preferred embodiment, the filter press tail, follower, and head, referred to generally as head members, are comprised of core material inserts encapsulated with fiber reinforced plastic. Laminates have a thickness and fibers are oriented to optimize the construction strength of the components based on stresses that are preferably anticipated through techniques such as finite element analysis. Unidirectional fiber reinforced plastic is used to form an endless looping sideband that encircles the head members and is suitably capable of supporting the very high forces normally associated with filter presses. Multidirectional fiber reinforced plastic is used to form the head members. Metal inserts with knurled outer surface and inner threads for steel bolts are used to connect a drive and/or hydraulic cylinder between the tail and follower.

27 Claims, 5 Drawing Sheets

FIG. 3

FILTER PRESS FRAME

BACKGROUND OF THE INVENTION

1. Field of the Invention

The present invention relates generally to a filter press frame and, more particularly, to a lightweight, non-corrosive, filter press frame generally comprising head, tail, follower, side band and legs typically operable for compressing a plurality of filter elements.

2. Description of the Background

Filter presses have been used for over a century to separate liquids from solids. Yet to a large extent, today's filter press frames use the same technology that was used one hundred years ago. Today's filter presses also have the same corresponding problems that have plagued filter presses for the last century.

This is not to say that filter presses are not the most efficient means to perform certain widespread processing functions. Filter presses are quite effective and economical for the job they are intended to perform. Therefore, filter presses are used in many different processes.

During the last century, filter presses have found and continue to find wide and increasing use both in manufacturing processing and in ecological maintenance such as waste treatment. An incomplete list of filter press manufacturing process usage today includes manufacturing of pigment and dyestuff, pulp and paper, wine and beer, mining processes and production of precious metals, ceramics production, production of food colors and many food products, pharmaceuticals, chemical processing, silicone fluids, oil field brine filtration, sugar syrups, protein extraction, and the like. Filter presses process waste including metal and plastic waste treatment, plating waste recovery, ferrous and non-ferrous foundry waste, steel mill waste, printed circuit board waste, tannery waste, fiberglass production wastes, metal tubing part tumbling wastes, municipal wastes, lime softening, offshore oil well drilling fluid wastes. Filter presses are found in lumber treatment plants, power oil refineries and petrochemical plants, power plants, shipyards, food production plants, storage terminals, retention ponds, shipyards, boiler plants, and other plants related to the products listed above.

In operation, a filter press applies a large force to a stack of filters to thereby seal, pressurize, and squeeze the fluid within the filter press system through each filter. The fluids used with filter presses are often reactive bases or acids. The forces required to seal the stack of filters with the liquid therein under pressure is typically in the tens of thousands of pounds or more. For this reason, despite the problems associated therewith, filter presses have required and used a massive iron frame for the last century. The iron frame is very heavy, requires significant expensive machining operations to manufacture, and requires extensive maintenance such as sanding and painting to avoid damage by caustic/acidic/corrosive fluids. Thus, the costs of maintenance, the costs of transportation, and operation, as well as the costs of making of filter press frames is high. Stainless steel is sometimes used for making filter presses used but has never been a completely satisfactory substitute. Stainless steel is more expensive than iron, is just as heavy, and does not always prevent corrosion.

Representative patents to problems related to filter presses, filter press frames, and operation of filter presses include the following:

U.S. Pat. No. 4,500,379, issued Feb. 19, 1985, to Ford et al., discloses a composite fiber reinforced plastic frame having a core material at least partially formed from the continuous wrapping of roved layers of glass fiber impregnated with a catalyzed thermosetting resin within a corrosion resistant liner and having reinforced corners. This type of filter press is not the type of filter press concerned with this application and does not have a head, tail, follower, side band and other components for pressuring a stack of filter plates. Instead, this type of filter press carries electrodes on each side of the frame and operates by chemical reaction when voltage is applied to the electrodes, rather than by application of a physical pressure on a fluid to force the fluid through one or more filter elements. Filter presses of the bipolar membrane cell type have long been constructed of heavy plastic, which has long been a suitable material for the relatively very light physical loads.

U.S. Pat. No. 4,155,830 issued May 22, 1979, to Sukhobrusov et al., discloses a filter press including a support plate and a pressure plate and a set of chamber-type filter plates arranged therebetween. Each filter plate is provided with a cloth filtering barrier in the form of an endless belt which is supported by two rollers fastened to two opposite walls of the filter plate in such a manner that both runs of the belt extend on the side of a draining barrier of the filter plate.

U.S. Pat. No. 5,482,623, issued Jan. 9, 1996, to H. G. W. Pierson, discloses a plurality of substantially parallel filter plates assembled as a unit and locatable within a substantially rigid outer shell to provide a closed vessel. Either or both of the unit and the shell are movable relative to the other between a position wherein the unit is sealed within the shell to enable pressurized supply to the shell of the medium to be filtered via the plates and a position wherein the unit is at least partially removed from the shell to enable discharge of resultant filter cake from the plates. A substantially flexible membrane is provided as a lining to the shell so that a space between the lining and the shell is inflatable by pressure medium.

U.S. Pat. No. 3,926,811, issued Dec. 16, 1975, to W. Ramsteck, discloses a pair of geometrically identical filter plates lying one against the other which are each formed with a rigid central panel and a rigid frame surrounding the panel. A flexible web interconnects the outer edge of the rigid panel and the inner edge of the frame so as to allow this panel to be displaced by fluid pressure between the panels so as to press a filter cake.

U.S. Pat. No. 4,166,035, issued Aug. 28, 1979, to W. Ramsteck, discloses a filter plate assembly for a filter press with a substantially rigid support plate against which bears a filter plate. This filter plate is integrally formed of elastically deformable material and has an annular outer frame which lies against the support plate and defines a frame plane.

U.S. Pat. No. 4,508,623, issued Apr. 2, 1985, to Heckl et al., discloses a filter plate assembly which has a substantially rigid support plate having a face formed of a central region and an outer periphery bounding the region, a substantially rigid annular frame having a annular face at least closely confronting the support plate face at the periphery, and a generally planar and elastically deformable central filter panel formed integrally with the frame and engageable with the central region with the periphery.

A review of the above patents shows that there remains a need for a lightweight, corrosion resistant filter plate frame assembly that offers dependable operation at reduced levels of capital investment. Those skilled in the art have long sought and will appreciate the present invention which addresses these and other problems.

SUMMARY OF THE INVENTION

The filter press frame of the present invention is designed to be lightweight, cost less to manufacture, and also be highly resistant to corrosive chemicals. The filter press frame and method of the present invention may be used with a plurality or a stack of filter plates including one or more filter plates having filter elements for separating a fluid under a pressure, and a drive for compressing the stack of filter plates. The filter press comprises first and second head members positioned on opposite ends of the stack of filter plates that are translationally relatively moveable with respect to each other. The drive is secured to at least one of the first and second head members. At least one of the first or second head members is comprised of multi-directionally, that are preferably birectionally oriented fibers, because the forces acting on the first and second head members are bidirectional forces.

At least one support member is provided and has a load bearing region for supporting force produced as a result of the pressure applied between the first and second head members by the drive. In a preferred embodiment, the support member is an endless or continuous band or sideband that extends continuously around the stack of filter plates and the first and second head members. The at least one support member preferably comprises fiber reinforced plastic that are preferably unidirectionally oriented fibers so oriented to most efficiently or optimally support the substantially unidirectionally oriented force.

The at least one support member defines a hole therethrough on at least one end. A slit is preferably made in line with the unidirectionally oriented fibers and the slit is opened to define the hole. In this presently preferred manner, the fibers are left substantially intact to maintain strength. The at least one support member is curved around each of the first and second head members. In a preferred embodiment, the support member is substantially elliptically curved around each of the first and second head members. Each of the first and second head members defines a curved slot for receiving the at least one support member.

At least one of the first head member or the second head member or the support member is comprised of a group of materials consisting of polymeric material, plastic, engineering plastic, or fiber reinforced material. More specifically, the support member has a load bearing region for supporting force produced as a result of pressure applied between the first and second head members by the drive, the load bearing region being comprised of one or more materials from a group of materials consisting of polymeric material, plastic, engineering plastic, or fiber reinforced material (such as plastic or polymeric material). As well, each of the first and second head members have respective first and second load bearing regions for supporting force produced as a result of pressure applied between the first and second head members by the drive, with the load bearing region being formed from one or more materials from a group of materials consisting of polymeric material, plastic, engineering plastic, or fiber reinforced material.

At least one of the first and second head members is comprised of a honey comb, plastic, or core material filler material elements encapsulated with fiber reinforced material. At least one of the first head member or the second head member or the support member is comprised of multi-directionally oriented fibers of the fiber reinforced material. Preferably the support member is comprised of unidirectionally oriented fibers of the fiber reinforced material. At least one of the first and second members has a substantially triangular cross-sectional shape.

Each of the first and second head members and the support member have a stress region wherein stress is produced as a result of the compression by the drive. The stress region of at least one of either the first head member or the second head member or the support member has a surface comprised of a material more resistant to corrosion by hydrochloric acid and bleach than stainless steel. The stress region is comprised of encapsulated core material. The stress region is also comprised of ribbed material with ribs that increase in thickness where the stress increases.

Leg members for the filter press frame are used to hold the first and second head members and the at least one support member off of the ground. The leg members are preferably comprised of one or more materials from a group of materials consisting of polymeric material, plastic material, and fiber reinforced material.

A method for a filter press frame, with the filter press being of the type for use with a plurality of filter plates, includes providing fiber reinforced material for constructing the filter press frame, determining a location of stress loads in the filter press frame, and orienting fibers within fiber reinforced material for supporting the stress loads.

The method further comprises extruding or pultruding material for providing the support structure and molding holes in a first head member. Steel inserts are provided for screws in the first head member. Extruded or preferably either pultruded or filament wound composite material provides a band that slidingly supports the stack of filter plates; the band is attached to the first and second head members such that it will support force acting between the first and second head members on the stack of filter plates. A metal insert is connected to plastic material within at least one of the first and second head members.

It will be noted that each of the filter plates has a dimension, such as a diagonal dimension, related to filter capacity. The first and second head members and the support member are sized to support the filter plates having the dimension related to filter capacity. At least one of the first head member, the second head member, or the support member is comprised of a material such that it has a weight less than a corresponding weight of a corresponding first head member, second head member, or support member sized to support the filter plates having the dimension related to filter capacity and being substantially formed of either steel, stainless steel, iron, or aluminum.

It is an object of the present invention to provide an improved filter press frame and method of manufacturing the same.

It is another object of the present invention to provide a filter press frame for use with a stack of filter plates that is lighter, yet just as strong, as any presently available filter press that is used to support an equivalent stack of filter plates.

It is yet another object of the present invention to provide a filter press frame that is more corrosion resistant to bases and acids than presently available filter press frames.

A feature of the present invention is the extensive use in the heads of light weight core material that is encapsulated in fiber reinforced plastic.

Another feature of the present invention is an endless (looping) side band comprised of unidirectionally oriented fibers within fiber reinforced plastic that will support and evenly distribute the very large forces involved to the head and tail.

Yet another feature of the present invention is a geometrical shape that is produced as a result of analysis of forces acting on the components thereof such that the fiber reinforced plastic is oriented and positioned to support the stresses with a substantial safety overload built into the design.

An advantage of the present invention is that the light weight construction makes the filter press of the present invention much easier and less costly to transport, assemble, and operate.

Another advantage is that the highly corrosive resistant materials make the filter press of the present invention much easier to maintain with no need for sand blasting, painting, and so forth.

Yet another advantage of the present invention is the avoidance of extensive machining during manufacture of the filter press to reduce cost of manufacturing the filter press of the present invention.

These and other objects, features, and advantages of the present invention will become apparent from the drawings, the descriptions given herein, and the appended claims.

While the present invention will be described in connection with presently preferred embodiments, it will be understood that it is not intended to limit the invention to those embodiments. On the contrary, it is intended to cover all alternatives, modifications, and equivalents included within the spirit of the invention and as defined in the appended claims.

DETAILED DESCRIPTION OF THE PREFERRED EMBODIMENTS

Figure 1:
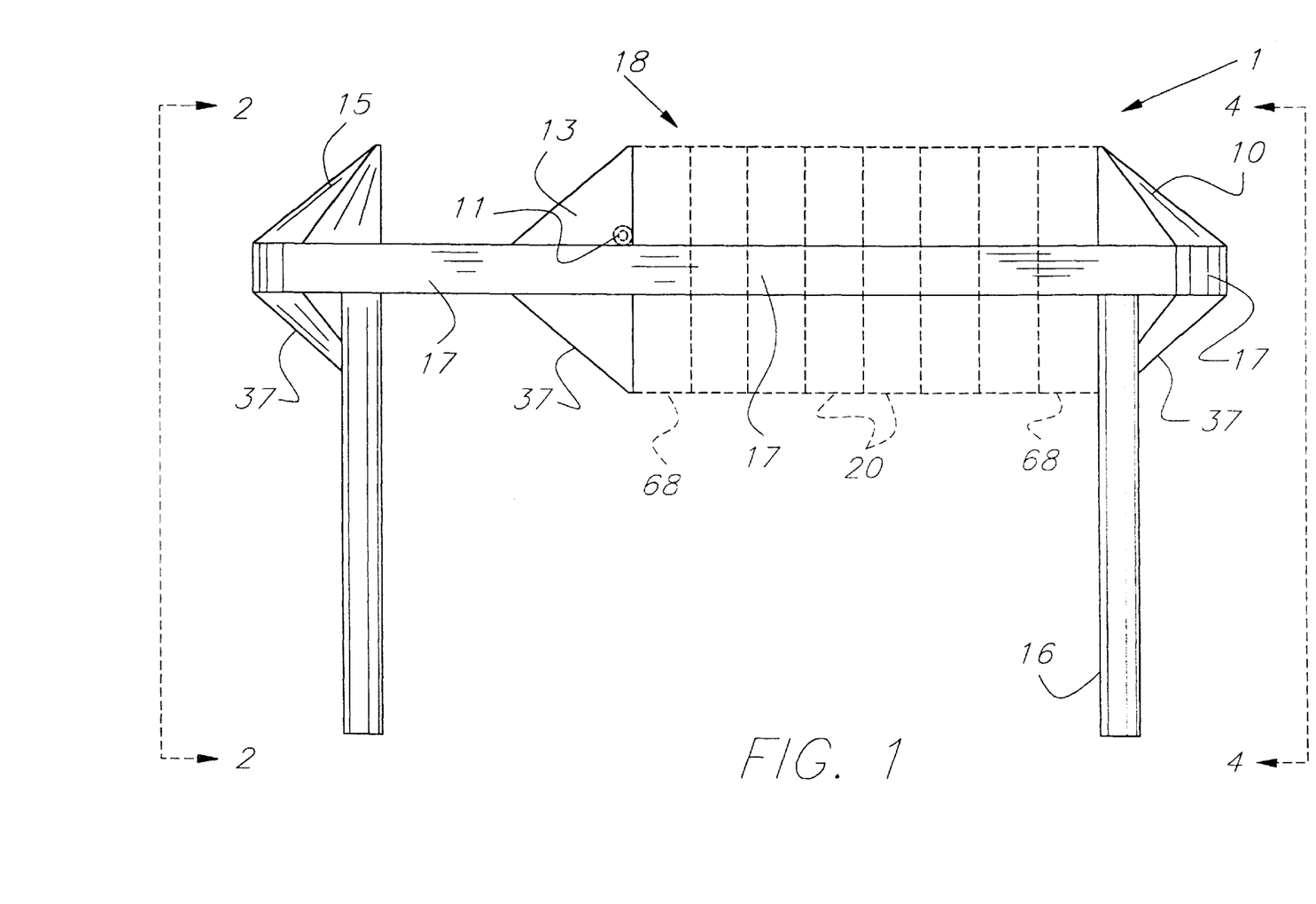
FIG. 1 is an elevational view, of a filter press in accord with the present invention.

Referring now to the drawings, and more particularly to FIG. 1, there is shown filter press 1 that is a presently preferred embodiment of a filter press in accord with the present invention. Filter press 1 represents a tremendous improvement over prior art filter presses because it is less expensive to manufacture, less expensive to operate, and simply because it weighs much less than an equivalently sized filter press. Difficulties of problems in manufacture, operation, and weight have plagued filter press operators for at least one hundred years. The use of composite materials in the design of the filter press provides a great advantage over the use of steel, stainless steel, and/or aluminum as used in designs for the last one hundred years. The present invention also provides solutions to various problems encountered when attempting to design a filter press when constructed other materials besides high strength, homogeneous, steel and stainless steel. Steel filter press components handle the large forces but are heavy, difficult to manufacture, and highly prone to corrosion.

The geometry of the design of filter press 1 is preferably based on finite element analysis techniques and thereby optimizes use and layout of the composite materials from which it is made. If different materials are used, or if a different size filter press or if different operating constraints are desired, it is advisable to obtain a new finite element stress analysis and adjust the structure accordingly. As discussed in more detail below, it will be seen that the preferred method of construction includes selection of materials, location of stresses, orientation of fiber reinforced material to support stresses, and avoidance of point loading above safety factor levels (which safety factor may be about four times anticipated load) to accommodate stresses. The design of the preferred embodiment shown in FIG. 1 stipulates a 630 mm filter press that incorporates a maximum filtration pressure of 100 psi. While the specifically selected materials of the present invention are discussed below with respect to the components of filter press 1, suitable materials may include composite materials, polymeric materials, fiber reinforced polymeric material, plastic generally and engineering plastic for improved performance characteristics. These above described materials are assumed to include ceramic materials, resins, glass materials, glass fibers including globular glass, metallic fibers, steel fibers, carbon fibers, and other fibers that may be used in fiber reinforced materials, as well as rubbers, textiles, adhesives, plasticizers, and stabilizers. Core materials may be a wide range of materials including but not limited to fillers, polyurethane foam, or other foam materials, foamed plastics, cellular plastic, high density or low density materials, cork, wood, cloth, or any other materials that are suitably used as core material in the design constraints as discussed hereinafter for a specific design. Definitions for such terms may include those found in Volumes 1 and 2 of Engineering Plastics by ASM International, 1988, which is incorporated by reference and especially section 1 Glossary of Terms, pages 2–47 in Volume 2.

Filter press 1 includes head 10, follower 13, and tail 15. For purposes of this application, any of these items may be referred to generically as a head member which is desirable since they all share certain similarities. Certain differences are also discussed. In the present embodiment, the head members have an applied load in the range of 65,000 pounds. The head members are preferably made from basic materials of construction that include bidirectional fiberglass with vinyl ester resin for the laminates and polyurethane foam core as discussed more with respect to cross-sectional views shown in FIG. 8 and FIG. 9.

In operation, follower 13 translationally or axially slides along and is supported by sideband 17 (which may also be referred to generally as a support member in this specification) towards and away from head 10. Follower 13 is preferably supported in a slot, such as slot 20, shown in FIG. 8. Wheel 11 may be used to reduce friction. When follower 13 slides towards head 10, sealing is effected for stack of filter plates 18, as indicated in dash and consisting of a plurality of individual filter plates 20. Specifics of seals between the filter plates are known to those skilled in the art. The filter plates normally have a substantially square or rectangular shape as is exemplified in the square shape or perimeter 21 of head 10 in FIG. 4 and tail 15 in FIG. 2.

Figure 2:
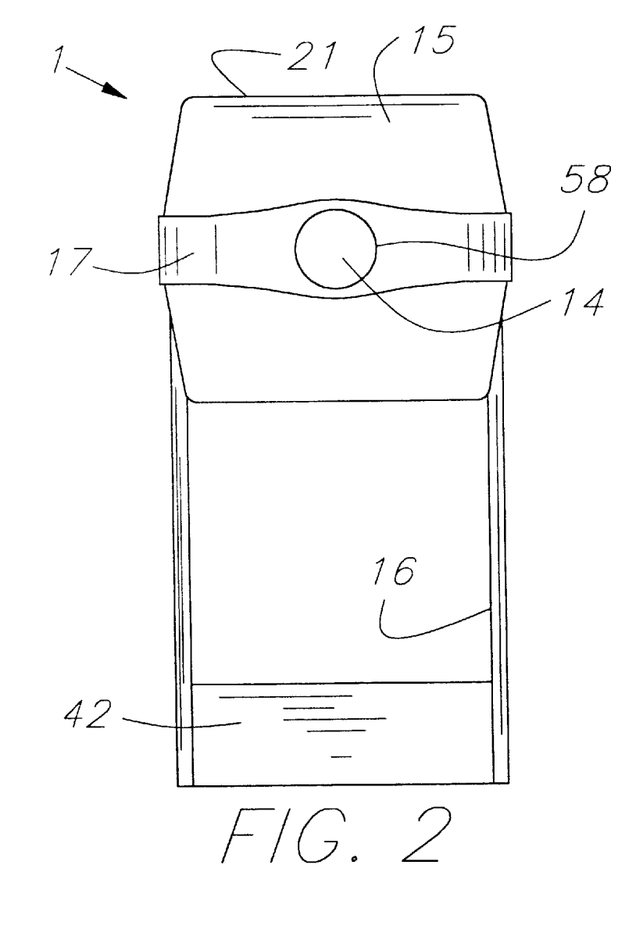
FIG. 2 is an elevational view along lines 2—2 of FIG. 1.
Figure 3:
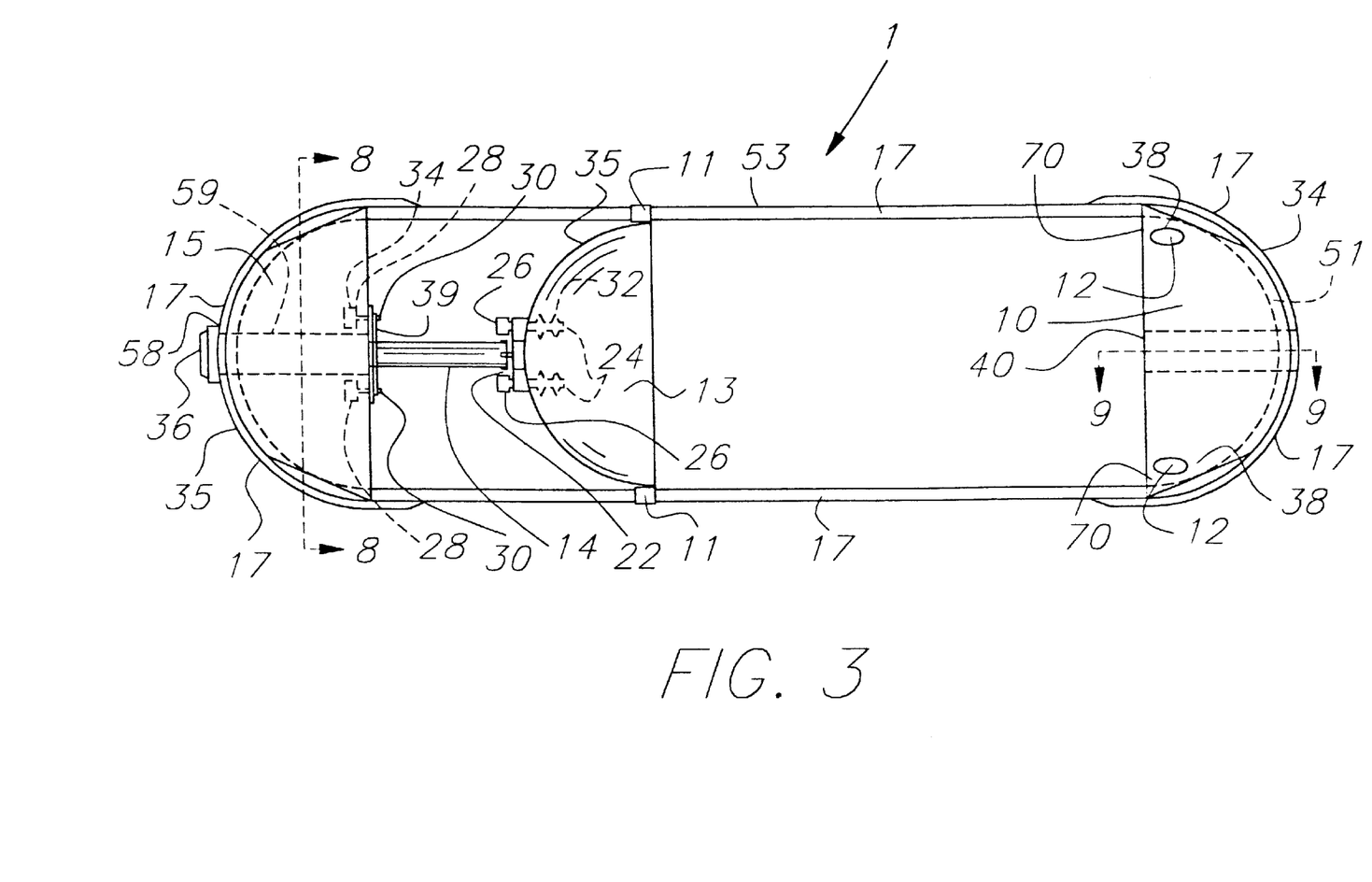
FIG. 3 is a top view, partially in section, of the filter press of FIG. 1.

As shown in FIG. 3, follower 13 is driven by a drive mechanism that may be of various types including hydraulic or mechanical means. Drive member 14 is indicated as the shaft of the drive that engages follower 13 via plate 22 that is secured to follower 13. Preferably, plate 22 is secured to follower 13 with metal bolts 26 that connect to metal inserts 24 that are mounted within fiber reinforced follower 13. Likewise, plate 39 is preferably mounted by metal bolts 30 within metal inserts 28 that are mounted within fiber reinforced tail 15. Metal inserts 24 and 28 have internal threads that mate to bolts 26 and 30, respectively. Metal inserts 24 and 28 have coarse threads and/or flanges and/or knurls as indicated at 32 and 34, respectively, that mate to and grip the fiber glass reinforced material. Hydraulic cylinder 36 is part of drive operating drive cylinder 14 and mounts within cylinder 59 of tail 15 and extends through hole 58 of sideband 17 (see also FIG. 2). In the presently preferred embodiment, sideband 17 is an endless band that extends entirely around all the heads, as discussed subsequently. It will be understood that the load acts on all head members, in this case the load is designed to be about 65,000 pounds.

Figure 4:
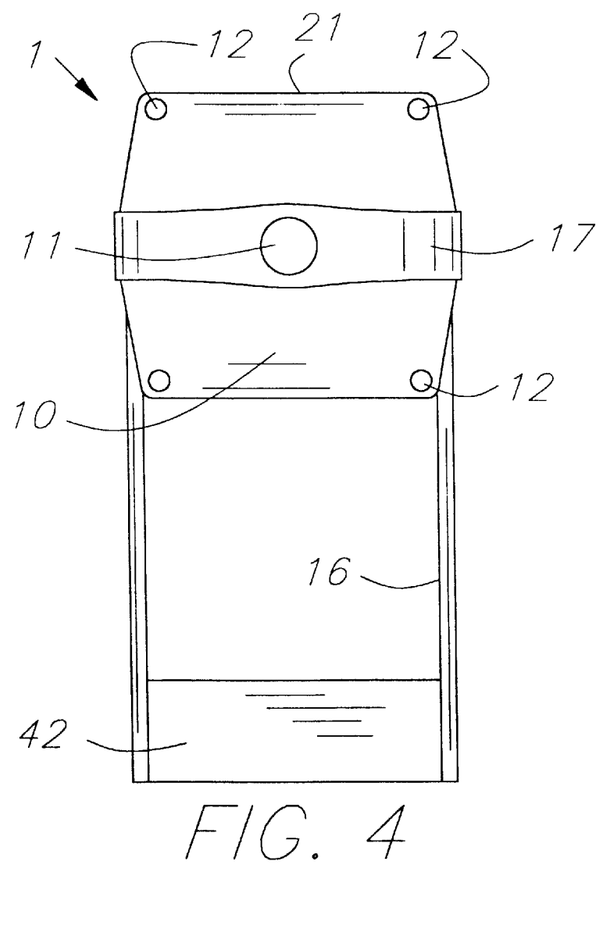
FIG. 4 is an elevational view along lines 4—4 of FIG. 1.

FIG. 4 show fluid feed tube 11 and four dewatering tubes 12. These tubes may include TEFLON or PVC pipes inserted therein for additional corrosion resistance, if desired. It will be understood that the number and positioning of feed tube 11 and dewatering tubes 12 may vary in different units.

In this particular design, the heads have a square perimeter 21 to match the square shape of filter plates 20, but have a curved, round, or preferably elliptical surface or perimeter 35 as viewed from top view FIG. 3, and a substantially triangular surface or perimeter 37 as viewed from the view of FIG. 1. This shape is optimized to handle stress which will be largest in the region of sideband 17. The curved, preferably elliptical ends of the heads provide a geometry that acts to even out stress loads and prevent point stresses. As stated above, a finite element analysis is preferably made for each size press to be made so that the stresses and structure can be accordingly designed for optimal strength. A safety factor of about 4.0 times maximum compression stress of 4000 psi yields 16000 psi which is well below the 23 ksi compression allowable of the strength of the bidirectional cloth. The bidirectional fiberglass cloth listed above as a presently desired basic material of construction is discussed more below. Other allowable strengths of the bidirectional cloth are 33 ksi tensile strength and 6 ksi shear strength. The strength of the particular materials selected is generally available from the reference listed above, but for general design use should preferably be batch tested to confirm the properties. In the present case, the large safety factor built in would also act to reduce the significance of any property discrepancies.

Orientation of the fibers of the cloth is therefore desirable because the materials are not normally sufficiently homogeneous. As well, the shape, buildup, and thicknesses of the present design have been made so that adequate strength of materials is found to support the stresses anticipated based upon a finite element analysis of the anticipated stresses. The preferred dimensions of this presently preferred embodiment of this size are given as discussed below and the drawings are approximately to scale so that with the safety factors, the present design is considered well within ranges necessary to support the heavy operation forces. It will be noted that operating stresses in filter press 1 may vary as operating conditions change. For instance, upon sealing of filter plates 18 by application of force with drive 14, maximum stresses in the region of the head 10 are shown at approximately indicated at stress region 38. After the fluid is pressurized up to 100 psi, this maximum stress decreases as the fluid provides support along face 40. These stresses are the result of the shape of the head including location of fluid flow paths and the like.

Legs 16 are preferably also made of fiber reinforced material but since the filter press 1 of the present invention is rather light as compared to the very heavy filter press that would normally be required for this size filter pack arrangement this is not actually necessary. Legs 16 could be made of wood or any other suitable material simply strong enough to support the heads and sideband and filter plates. In a preferred embodiment legs 16 will be molded with a curved shape that is designed for aesthetic purposes. Brace 42 at the base of legs 16 prevents any possibility of bending of legs 16 so as to make a sturdy structure.

Figure 5:
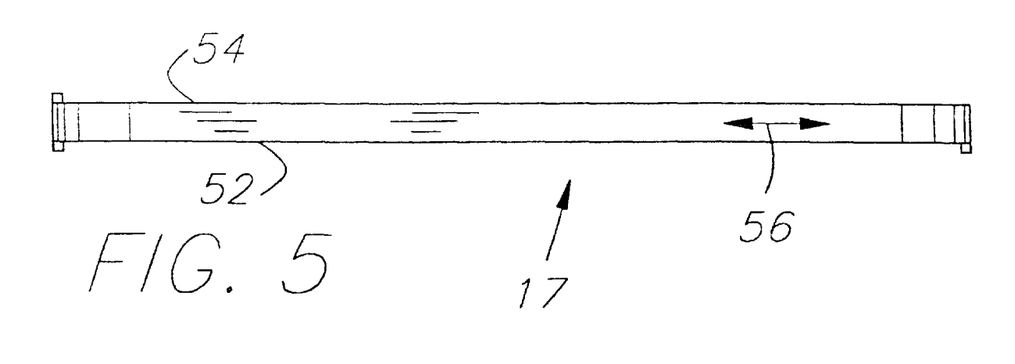
FIG. 5 is an elevational view of a side bar band in accord with a preferred embodiment of the invention.
Figure 6:
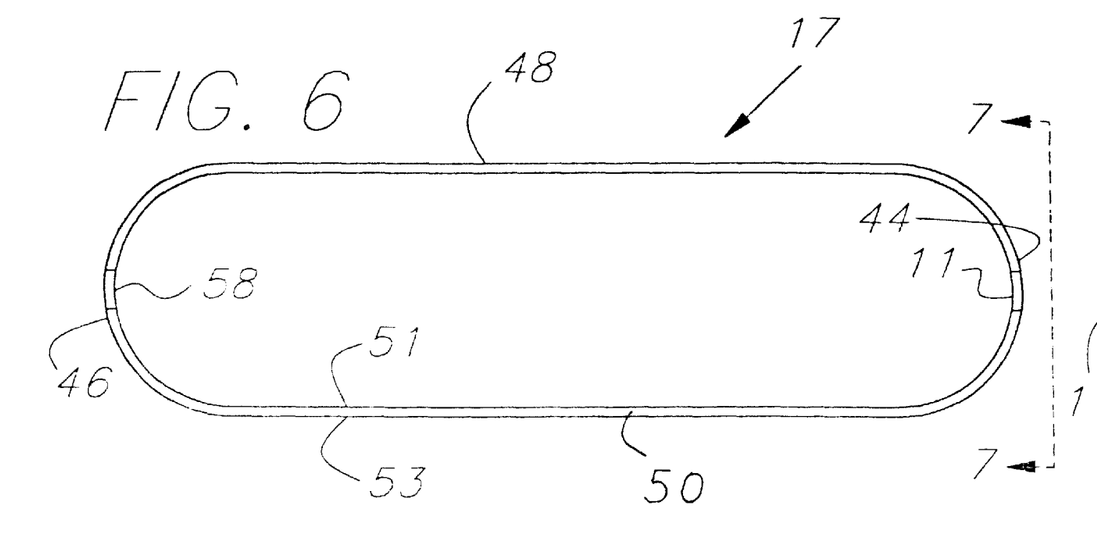
FIG. 6 is a top view, partially in section, of the side bar band of FIG. 5.
Figure 7:
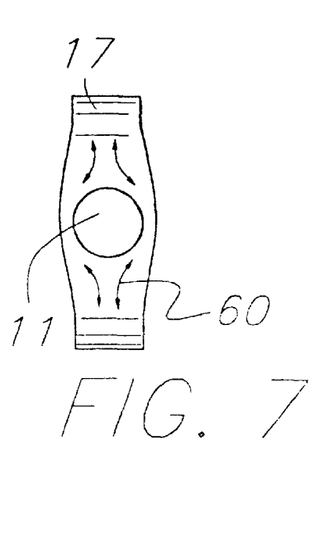
FIG. 7 is an elevational view along lines 7—7 of FIG. 6.

FIG. 5, FIG. 6, and FIG. 7 disclose sideband 17 that provides very adequate support for the 65,000 pound forces applied between the heads. The general dimensions for this particular case are about six feet from end 44 to end 46, with about twenty six inches from side 48 to side 50, and with a thickness between inner and outer band surfaces 51 and 53 of from one to two inches. The height is approximately five to six inches from bottom 52 to top 54. While bidirectional fiber material is used with the heads, as discussed below, unidirectional fiberglass is preferably used in making sideband 17. By unidirectional, it is meant that the fibers are substantially oriented in one way. By design, the fibers are oriented in the direction of the maximum stresses, as indicated at arrow 56. Thus, the fibers are oriented to enhance the strength of the structure. As well, it will be noted that sideband 17 is an endless band. Sideband 17 is made from filament wound or pultrusion (extrusion) process so as to provide the unidirectional fiber orientation. Sideband 17 may be prestressed during construction, if desired.

FIG. 7 shows hole 11 in sideband 17 at end 44. As indicated in FIG. 2 there is also hole 58 for the hydraulic cylinder at end 46. Hole 11 is preferably not simply cut into sideband 17 but rather the unidirectional fibers indicated by arrows 60 are effectively slit in the direction of their orientation and then redirected around hole 11 as indicated by arrows 60. In this way, the fiber strength of sideband 17 is substantially maintained where holes are used without a great deal of build up of extra material in this stress region. Once slit, the hole is then built up for a tubular element shape with the fiber reinforced material buildup made to be circular. The same operation is preferably formed at end 46 to form hole 58.

Figure 8:
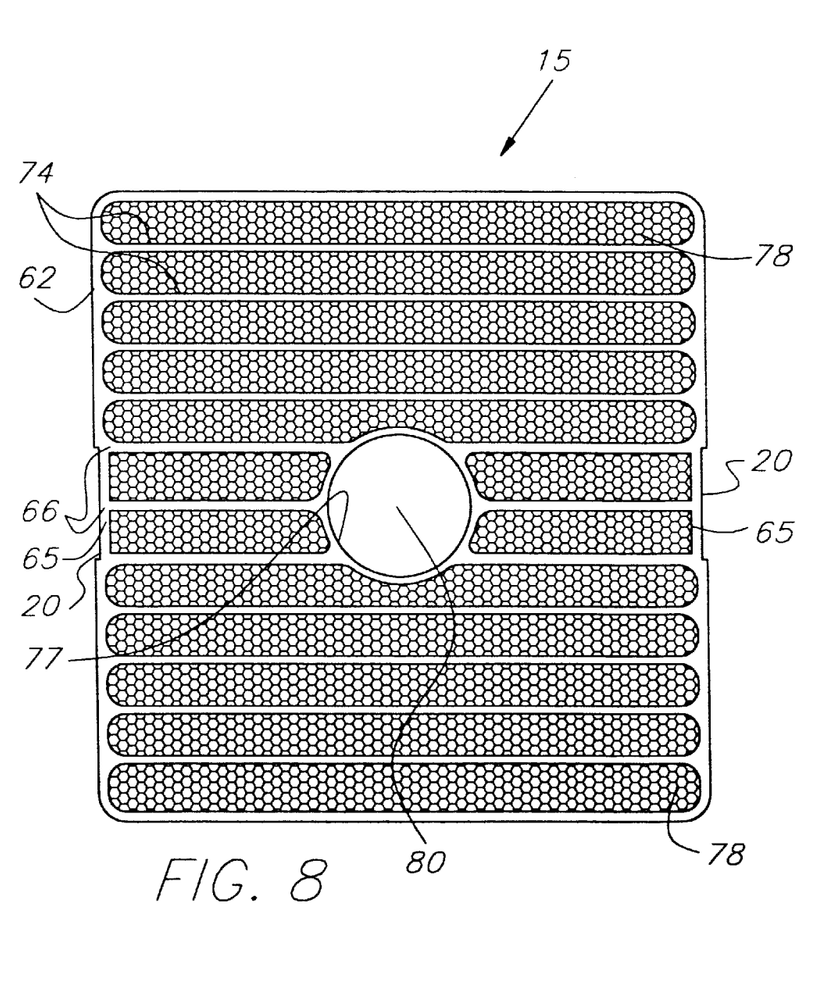
FIG. 8 is a cross-sectional view along lines 8—8 of FIG. 3.
Figure 9:
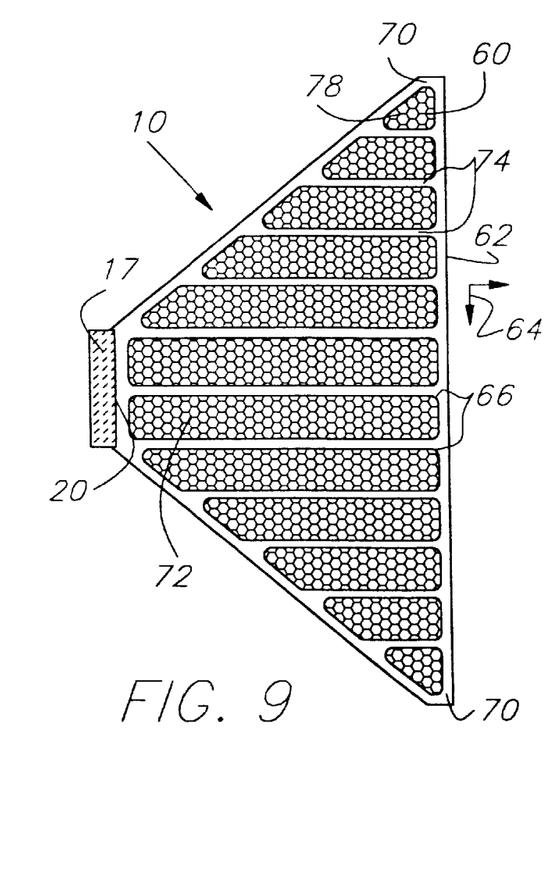
FIG. 9 is a cross-sectional view along lines 9—9 of FIG. 3.

FIG. 8 and FIG. 9 show cross-sections of the head members as indicated. It will be noted the head members are preferably formed of a honey comb, plastic, or core material structure. A honey comb structure is indicated at 60. External skin 62 is preferably about ⅜ inch thick and includes a bidirectional fiber reinforced plastic which in this case is a bidirectional fiberglass lamination with a vinyl ester resin matrix. The fibers are oriented bidirectionally (multidirectionally) in the direction of the stress forces that, in the heads, proceed in more than one direction. Arrow 64 indicates a bidirectional fiber orientation. Within honeycomb, plastic, or core material structure 60 are core elements 78 formed of core material, some of which types are listed above, and which in a preferred embodiment are formed of high density polyurethane foam (16 pcf), but could also be low density or solid material as well as other core materials. Each core element 78 is encapsulated preferably in fiber reinforced plastic as discussed.

Sideband 17 engages each head member at slots 20 along each head and around tail 15 and head 10 that provide a recessed area being sized to receive sideband 17. Follower 13 is supported by sideband 17 in such slots for translational movement as discussed above. The head members have an applied load of 65,000 pounds that is transferred from sideband 17 into the heads uniformly along the preferably elliptical path (within a slot such as slot 20) where tail 15 and head 10 engage sideband 17. External skin portion 65 in slot 20 and large internal ribs 66 transfer the loads end filter plates 68 along surface edge 70. A high stress for head 10 of the present design is approximately 4000 psi compression near the mid section of outer skin approximately in the stress region indicated by 72. As discussed above, a safety factor of 4.0 yields 16,000 psi, which is well below the 23,000 psi compression allowable. Center or large ribs 66 and central tube wall 77 are preferably about ½ inch thick bidirectional fiberglass lamination with a vinyl ester resin matrix. Outer tube walls such as tube walls and outer ribs 74 may be thinner due to lower stresses and have been selected to be about ¼ inch thick. The laminate's edges are overlapped with a two inch wide bias strip of bidirectional fiberglass for effective transfer of the shear loads.

It will be noted that in the presently preferred embodiment that tail 15, which contains hydraulic cylinder 36, is made from the same materials as head 10 but the geometry is somewhat different in certain ways. Therefore, rather than the internal construction shown in FIG. 8, a presently preferred tail 15 has five internal ribs, such as internal ribs 66 adjacent to center tube 80 (as compared with the three rib construction shown in this embodiment that more closely describes head 10 internal structure). As before, all five internal ribs preferably have a wall thickness of ½ inch. External skin 65 of tail 15 in slot 20 has a wall thickness preferably in the range of ⅜ inch thick. This stress region is loaded by the 65,000 pound force from hydraulic ram 36 and is transferred to the area in slot 20 that bears on sideband 17.

It will also be noted that follower 13 has an applied load of 65,000 pounds due to drive shaft 14. This load reacts through follower 13 and then is transferred to surface edges, such as edges 70, that engage end filter plates, such as filter plates 68. When follower 13 is initially closed, the highest load is created in that general stress region around edges 70. Subsequently, the filter press is filled with fluid and pressurized to 100 psi. Then the forces are more evenly distributed, lowering the stresses. The structure of the tail is preferably the same as that illustrated in FIG. 8 with three internal ribs, except there are no holes in follower 13.

The materials listed above have a high resistance to corrosion as compared to stainless steel, carbon steel, or aluminum as per Volumes 1 and 2 of Engineering Plastics by ASM International, 1988, especially Vol 2, page 275. Here it is seen that fiber reinforced vinyl ester is resistant to sulfuric acid dilute, sulfuric acid concentrate to 75%, hydrochloric acid dilute and concentrate, hydrofluoric acid, phosphoric acid dilute and concentrate, sodium hydroxide dilute and concentrate to 50%, acid chloride salts, bleach, wet chlorine and nitric acid to 40%. The chart of Table 5 on page 275 of the above reference is hereby incorporated herein by reference. Selected comparison of stainless steel shows that steel is recommended for sulfuric acid only below 5% concentration and only where little water is present in concentrates above 85%, not recommended for hydrochloric acid, hydrofluoric acid, sodium hydroxide, acid chloride salts, bleach, and wet chlorine. Thus, it can be seen that even as compared with stainless steel, the preferred materials of the present invention, as well as other potential materials, are highly preferable over a wide range of the pH spectrum. The resistance to corrosives makes maintenance much easier as compared to iron or stainless steel filter presses. Iron filter presses must be frequently sand-blasted and painted. Stainless steel does not provide protection where joints are made and is much less resistant to corrosives as indicated with specific chemicals listed above. The filter press of the present invention may be colored, if desired, and this color will stay with the filter press over a long period without need for frequent sandblasting.

As well, the filter press frame of the present invention is much lighter than steel, iron, stainless steel filter presses and would be lighter than aluminum filter presses where such is possible. Thus, for the same filter plate size, which is usually given by diagonal size or square surface size, the filter press of the present invention is lighter than any material that filter presses have previously been made of including steel, iron, stainless steel, and/or aluminum. Yet the filter press of the present invention is capable of handling the same stress loads.

Manufacturing costs are also lower as compared to steel filter presses. For instance, instead of machining the holes into the heads, which is costly and time consuming, the holes can simply be molded therein. Other structures such as joints, plates, and so forth for the particular drive that previously required machining can often be easily molded.

The foregoing disclosure and description of the invention is illustrative and explanatory thereof, and it will be appreciated by those skilled in the art, that various changes in the size, shape and materials as well as in the details of the illustrated construction or combinations of features of the various filter press frame elements may be made without departing from the spirit of the invention. For instance, in some cases it may be more desirable or less expensive to use random-oriented fibers, chopped glass mats, woven roving and other forms as before disclosed specifically as to a presently preferred embodiment. As well, various materials including those listed herein could be used where a specific presently preferred embodiment material is disclosed. As discussed, the stresses are preferably analyzed by finite element analysis, the materials selected based on requirements, the materials are oriented and geometrically sized to make stress loads as uniform as possible while supporting the highest loads with a suitable safety factor where it can be seen that other geometries may also be used depending on requirements of the system. Other arrangements for the support band could conceivably be made including parallel endless bands or bands with support members and/or additional support bands in non-endless sections.

What is claimed is:

1. A filter press frame for supporting and compressing a stack of filter plates including one or more filter plates having filter elements for separating a fluid under a pressure, said filter press comprising:

first and second head members adapted to be positioned on opposite ends of said stack of filter plates, said first and second head members being translationally relatively moveable with respect to each other for compressing said stack of filter plates therebetween, a drive element being secured to said first head member;

a tail member positioned such that said first head member is between said tail member and said second head member, said tail member and said second head member being rigidly affixed with respect to each other, said first head member being translationally relatively moveable with respect to said tail member and said second head member;

said drive element being located between said tail member and said first head member for translationally moving said first head member for compressing said stack of filter plates; and at least one support member, said at least one support member having a load bearing region for supporting force produced as a result of said pressure applied between said first and second head members by said drive, said at least one support member being a continuous rigid band that extends continuously around said stack of filter plates and said first and second head members and said tail member, said at least one support member having a fixed shape that does not change as said first and second head members move with respect to each other, said tail member and said second head member being fixably and rigidly secured with respect to said at least one support member, said first head member being moveable within said at least one support member.

2. The filter press frame of claim 1, wherein:
said at least one support member comprises fiber reinforced plastic.

3. The filter press frame of claim 2, wherein:
said fiber reinforced plastic comprises unidirectionally oriented fibers.

4. The filter press frame of claim 1, wherein:
at least one of said first or second head members is comprised of bidirectionally oriented fibers.

5. The filter press of claim 1, further comprising:
said support member having opposing curved ends that respectively engage said tail member and said second head member, at least one of said tail member and said second head member defining an aperture therein,
said at least one support member defines a hole therethrough on at least one of said opposing curved ends, said hole and said aperture being aligned.

6. The filter press frame of claim 5, wherein:
said at least one support member comprises unidirectionally oriented fibers such that a slit is formed in line with said unidirectionally oriented fibers and said slit is opened to define said hole.

7. The filter press of claim 1, wherein:
said at least one support member has opposed first and second curved ends, said first curved end makes continuous rigidly fixed contact with said tail member throughout said first curved end and said second curved end makes rigidly fixed continuous contact with said second head member throughout said second curved end.

8. The filter press of claim 1, wherein:
said at least one support member is substantially elliptically curved around each of said first and second head members.

9. The filter press of claim 1, wherein:
each of said first and second head members defines a curved slot for receiving said at least one support member.

10. A filter press frame for supporting and compressing a stack of filter plates including one or more filter plates having filter sections for separating a fluid under pressure to produce a filtrate, a drive operable for compressing said stack of filter plates, said filter press frame comprising:
a first head member and a second head member adapted to be positioned on opposite outside ends of said stack of filter plates;
a tail member oriented such that said first head member is between said tail member and said second head member, said tail member and said second head member being affixed with respect to each other and said first head member being translationally relatively moveable with respect to said tail member and said second head member;
a drive element mounted between said tail member and said first head member for applying a compressing force to said stack of filter plates when located between first and second head members;
a support member for carrying said stack of filter plates and said first and second head members and said tail member; and
at least one of said first head member or said second head member having a load bearing stress region comprises fiber reinforced plastic, said compressing force producing a bending moment within said load bearing stress region, said load bearing stress region being sufficiently rigid to resist said bending moment.

11. The filter press frame of claim 10, wherein:
at least one of said first and second head members is comprised of core material encapsulated with said fiber reinforced plastic.

12. The filter press frame of claim 10, further comprising:
a metallic insert mounted within said at least one of said respective load bearing regions, said metallic insert being used to secure said at least one of said respective load bearing regions to said drive.

13. The filter press frame of claim 10, further comprising:
said support member having a rigid shape that does not change as said first head member moves translationally with respect to said tail member and said second head member.

14. The filter press frame of claim 10, wherein:
at least one of said first head member or said second head member being comprised of multi-directionally oriented fibers.

15. The filter press frame of claim 10, wherein:
said support member being comprised of unidirectionally oriented fibers.

16. The filter press frame of claim 10, wherein:
at least one of said first and second head members has a substantially triangular cross-sectional shape.

17. The filter press frame of claim 10, wherein:
said stress region of said first head member or said second head member comprises an encapsulated core material having a plurality of cells with each cell being formed of a relatively lightweight core material encapsulated with non-metallic material.

18. The filter press frame of claim 10, wherein:
said stress region is comprised of ribbed material with non-metallic internally positioned ribs that increase in thickness where said stress increases.

19. The filter press frame of claim 10, wherein:
said support member is curved adjacent each of said tail member and second head member.

20. A filter press frame for supporting a stack of filter plates including one or more filter plates having filter sections for separating a fluid under pressure to produce a filtrate, said filter press frame comprising:
first and second head members on opposite ends of said stack of filter plates for compressing said stack of filter plates therebetween, said first and second head members being translationally relatively movable with respect to each other;
a drive secured to at least one of said first and second head members;
a tail member positioned such that said first head m ember is between said tail member and said second head member, said tail member and said second head member being affixed with respect to each other and said first head member being translationally relatively moveable with respect to said tail member and said second head member, said drive being secured between said tail member and said second head member, each of said first and second head members having a stress region wherein a large bending moment is produced as a result of said compression by said drive, each of said stress regions comprising fiber reinforced plastic;

at least one support member, said at least one support member carrying said stack of filter plates and said first and second head members; and leg members for said filter press frame to hold said first and second head members and said at least one support member off of the ground, said leg members comprising plastic material.

21. The filter press frame of claim 20 wherein:

said at least one support member is comprised of a fiber reinforced plastic.

22. A filter press frame for supporting a stack of filter plates including one or more filter plates having filter sections for separating a fluid to produce a filtrate, each of the filter plates having a dimension related to filter capacity, the filter press frame comprising:

a first head member and a second head member on opposite ends of the stack of filter plates and a tail member positioned such that said first head member is between said second head member and said tail member, a support member for fixing said tail member and said second member in a fixed position with respect to each other, said first head member being translationally moveable with said drive with respect to said tail member and said second head member, and at least one of said first and second head members and said tail member being comprised of a plurality of cells of plastic encapsulated filler material wherein said filler material includes foamed materials or wood or cloth.

23. The filter press frame of claim 22, wherein:

at least one of said first and second head members is comprised of fiber reinforced material.

24. The filter press frame of claim 23, wherein:

said fiber reinforced material includes multi-directionally oriented fibers.

25. A filter press frame for supporting a stack of filter plates including one or more filter plates having filter sections for separating a fluid to produce a filtrate, each of said filter plates having a dimension related to filter capacity, said filter press frame comprising:

a drive for compressing said stack of filter plates;

first and second head members and a tail member formed of fiber reinforced plastic, said first head member being positioned between said tail member and said second head member, said tail member and said second head member being fixed in position with respect to each other, said first head member being relatively translationally moveable with respect to said tail member and said second head member with said drive for compressing said stack of filter plates, said first and second head members being securable to each opposing outer end of said stack of filter plates;

a plurality of metallic inserts each having external radially extending elements for securing said plurality of metallic inserts within said first head member and said tail member; and wherein said drive includes a rigid elongate metallic element, said rigid elongate metallic element being secured to said first head member and said tail member by said plurality of metallic inserts.

26. The filter press frame of claim 25, further comprising:

a plurality of metallic fasteners, and said plurality of metallic inserts each having internal threads for receiving said respective of said plurality of metallic fasteners.

27. A filter press frame, comprising:

a tail member including a pair of opposite sides, and an aperture extending through said pair of opposite sides of said tail member;

a first head member and a second head member each including a pair of opposite sides, said first head member being disposed between said tail member and said second head member, one of said opposite sides of said first head member being parallel to and facing one of said sides of said second head member;

a continuous band member extending around said tail member and said first head member for preventing said tail member from moving away from said head member, wherein said band member includes an aperture in coaxial alignment with said aperture in said tail member, and wherein said band member has a pair of generally linear portions extending between said tail member and said head member, said first head member being moveably mounted on said generally linear portions of said continuous band member;

a hydraulic cylinder extending through the apertures of said tail member and said band member, said hydraulic cylinder being rigidly mounted to said tail member and said second head member, said hydraulic cylinder being configured to move said first head member along said generally linear portions of said continuous band member.

* * * * *